United States Patent [19]
Streichenberger

[11] Patent Number: 5,370,476
[45] Date of Patent: Dec. 6, 1994

[54] SELF ANCHORING TIRE-MADE ARTIFICIAL REEF

[76] Inventor: Rodolophe Streichenberger, 301-½ Bay Front, Balboa Island, Calif. 92662

[21] Appl. No.: 115,455

[22] Filed: Sep. 1, 1993

Related U.S. Application Data

[63] Continuation of Ser. No. 897,911, Jun. 12, 1992, abandoned, and a continuation-in-part of Ser. No. 748,855, Aug. 23, 1991, abandoned.

[51] Int. Cl.⁵ .................................................. E02B 3/12
[52] U.S. Cl. ........................................ 405/25; 405/15; 405/21; 405/23
[58] Field of Search ................ 405/15, 16, 17, 21, 405/23, 24, 25

[56] References Cited

U.S. PATENT DOCUMENTS

| | | |
|---|---|---|
| 3,540,415 | 11/1970 | Bromley . |
| 3,842,606 | 10/1974 | Stiles et al. . |
| 4,139,319 | 2/1979 | Anderson ................ 405/16 |
| 4,188,153 | 2/1980 | Taylor ..................... 405/34 |
| 4,486,121 | 12/1984 | Thompson et al. ...... 405/17 |
| 4,854,774 | 8/1989 | Streichenberger ...... 405/25 |
| 4,872,782 | 10/1989 | Streichenberger ...... 405/24 |
| 4,950,104 | 8/1990 | Streichenberger ...... 405/24 |
| 5,024,560 | 6/1991 | Reilly ..................... 405/303 |

FOREIGN PATENT DOCUMENTS

| | | |
|---|---|---|
| 2514830 | 10/1976 | Germany . |
| 3010629 | 1/1991 | Japan . |
| 1523552 | 9/1978 | United Kingdom ........ 405/15 |
| 995717 | 2/1983 | U.S.S.R. . |
| 1021691 | 6/1983 | U.S.S.R. ................... 405/16 |
| 1110854 | 8/1984 | U.S.S.R. ................... 405/15 |
| 1110855 | 8/1984 | U.S.S.R. ................... 405/15 |
| 1416597 | 8/1988 | U.S.S.R. ................... 405/17 |
| 1546540 | 2/1990 | U.S.S.R. ................... 405/16 |
| 1585436 | 8/1990 | U.S.S.R. ................... 405/17 |
| 1604897 | 11/1990 | U.S.S.R. ................... 405/17 |

OTHER PUBLICATIONS

Alan T. White et al. "Artificial Reefs" ICLARM. 1990, p. 20.
De Witt O. Myatt et al. "New Jersey Tire Reef" pp. 807–808. 1989.
Don Chevallier. Ercon Systems Inc., Leaflet. Date (?).

*Primary Examiner*—Randolph A. Reese
*Assistant Examiner*—John A. Ricci

[57] ABSTRACT

A low relief artificial reef made of one or more threads of automobile tires partially buried in a sedimentary bottom and partially protruding above it. The artificial reef can be built on land and conveyed floating to the site of installment. It can also be built on a boat and dropped directly onto the water bottom.

7 Claims, 2 Drawing Sheets

SELF ANCHORING TIRE-MADE ARTIFICIAL REEF

This is a continuation of copending application(s) Ser. No. 07/897,911 filed on Jun. 12, 1992, now abandoned, which is a continuation-in-part of application Ser. No. 07/748,855 filed Aug. 23, 1991, now abandoned.

BACKGROUND OF THE INVENTION

The field of the present invention relates to tire-made artificial reefs which are placed on a water bottom for the enhancement of plant and animal aquatic life.

Heretofore a variety of artificial reefs have been proposed and constructed. One type of artificial reef consists of a plurality of tires formed in pyramidal modules, the modules assembled together and secured by heavy weights on the water bottom. This type of reef is unsatisfactory because fastenings and moorings often loosen and break away under storms. In an offshore California experiment, such an artificial reef was constructed but resulted in tires being scattered on neighboring beaches.

Another type of reef is made of a plurality of units consisting of tires partially embedded in concrete blocks. Such a construction is as much a concrete reef as a tire reef, with the correlative concrete reef disadvantages of weight, subsidence, expensiveness and lack of internal spaces.

Henceforth, aquatic enhancement programs need a new type of artificial reef which is inexpensive, sea life productive and resistant to surge and storm. Also, the present inventor has recognized that it is desirable for the artificial reef to be advantageously constructed from old automobile tires which are free of cost, have a very long life span and provide excellent sea life habitats because of their extended internal and external surfaces. In the U.S.A. there are 200 million old tires which yearly add to the industrial Waste. Changing the land environmental nuisance of old tires into a sea benefit for marine plants and animals is an ecological recycling achievement. The present inventor recognized this benefit in his co-pending U.S. patent application Ser. No. 07/748,855 filed Aug. 23, 1991, which is hereby incorporated by reference.

SUMMARY OF THE INVENTION

The present invention is an artificial reef constructed of a network of tires built by assembling and fastening the tires together in a desired configuration. When deposited along a sedimentary water bottom, the lower part of the tire network buries itself automatically in the sediments becoming anchored while the upper part of it remains protruding above the sediment level becoming an aquatic life habitat.

A preferable way to build the artificial reef of the invention is first to assemble threads of tires in a generally linear configuration and second to juxtapose or crisscross these threads to form the desired network. Juxtaposed or crisscrossed threads of tires may be interconnected and tied by fasteners. Also during the building process, tires should be cut to provide openings on their periphery so that air can escape out of the tires cavities and allow the tires to sink below the water surface.

According to another disposition of the invention, removable floats are incorporated into the tires' assembly to help floating and stabilizing a thread of tires on the water surface and facilitate the conveying or standby of a thread during installment operation.

According to another embodiment of the invention, floating artificial substrates are attached to the upper parts of the protruding tires. On these elevated substrates sea weeds, giant kelp and mussels can affix out of reach of creeping predators such as urchins and starfish which are unable to climb up the thin line connecting the floating substrate to the anchoring tire.

The present invention of a self-anchoring tire-made artificial reef with its many cavities, and internal and external surfaces, provides not only habitats and shelters to aquatic animals such as crustaceans, echinoderms, gastropods and other fish, it also supplies artificial substrates for the fixation of sessile vegetal and animal organisms. Seaweed and shellfish attach and grow on the parts of the tires which protrude above the sedimentary bottom. It is known that cavities to hide and substrates to affix are never enough for aquatic life in all salt or fresh waters. Nevertheless, these cavities and substrates are essential to the life of many aquatic species. Abundant, inexpensive, durable and stable cavities and substrates are characterized objects of the present invention.

The present inventor asserts these new devices and dispositions are important contributions for the development of tire-made, artificial reefs, the use of which has always been limited by poor fastenings and moorings and expensive construction processes. One purpose is to recycle used tires as a resource for building artificial reefs of the invention and to do it in the stormy environment of open coastal waters where the aquatic biomass of plants and animals has been devastated by over fishing, pollution, harbors, and marinas development and all kinds of human pressure.

Further objects and advantages of my invention will become apparent from a consideration of the drawings and ensuing description of it.

DETAILED DESCRIPTION OF THE PREFERRED EMBODIMENTS

Figure 1:
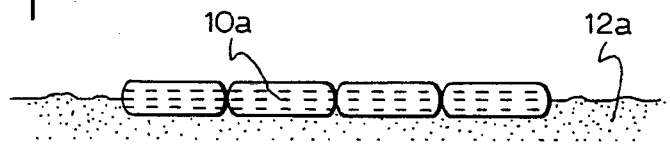
FIG. 1 is a diagrammatic side elevation view of a thread of tires assembled in a flat configuration.

FIG. 1 illustrates a side elevation view of a thread of four automobile tires 10a, forming a part of a network of tires according to the invention, laying flat on a sandy bottom 12a, tied together by fasteners which are not illustrated. The tires 10a are half buried in the sandy bottom 12a.

Figure 2:
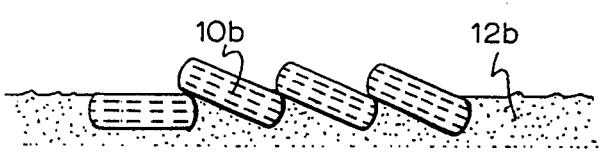
FIG. 2 illustrates a thread of tires in an inclined orientation.

FIG. 2 illustrates a side elevation view of a thread of inclined tires 10b, forming a part of a network of tires, laying inclined on a sandy bottom, tied together by fasteners which are not illustrated. The tires 10b are partially buried in the sandy bottom 12b, more deeply than the tires of FIG. 1 which are buried in the sandy bottom 12a, because of their higher position which has caused deeper scours.

Figure 3:
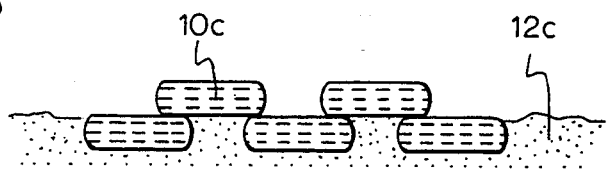
FIG. 3 illustrates a thread of tires in a stacked offset orientation.

FIG. 3 illustrates a side elevation view of a thread of offset and stacked or superimposed tires 10c, forming part of a network of tires, partially buried in the sandy bottom 12c and tied together by fasteners which are not illustrated.

Figure 4:
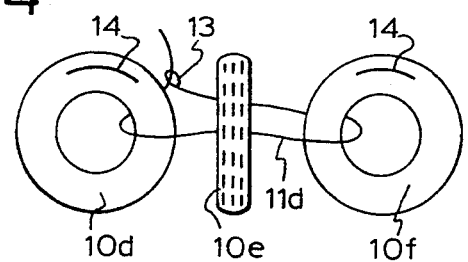
FIG. 4 is a side elevation view of a preferred tire unit assembly.

FIG. 4 shows three automobile tires 10d, 10e and 10f being assembled to make a thread of tires in a network of tires. Tire 10e stands vertical in between tires 10d and 10f which stand vertical in a plane perpendicular to the plane of tire 10e. A nylon rope 11d, diameter 10 mm., length 125 cm., connects tire 10d to tire 10f passing through the inner circle of tire 10e. On one end of rope 11d there is a loop 13 through which the other end of rope 11d is passed allowing a strong tightening of rope 11d which will fasten firmly tire 10d and tire 10f on each side of tire 10e. The same continuous assembling of a sequence of tires makes a thread of tires which will form part of a network of tires.

Another assembly method may comprise placing two tires 10e between tires 10d and 10f.

Before the assembling of tires, arch-like openings 14, 25 cm. long, have been cut with a knife on both peripheries of tires 10d, 10e, and 10f. Openings 14 of tire 10e cannot be seen in FIG. 4. When tires 10 are assembled in a thread according to the invention, all openings 14 are situated along one straight line. In FIG. 4 all openings 14 are situated at the upper position of tires 10 where they will let pockets of enclosed air escape from the tires after launching.

Figure 5:
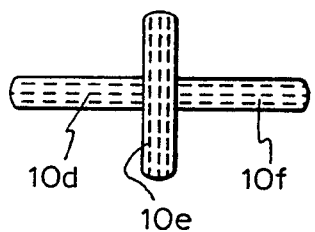
FIG. 5 is an other view of an assembled unit of FIG. 4.

FIG. 5 show tires 10d and 10f assembled on each side of tire 10e as in FIG. 4 after being firmly fastened, the tire 10e having been rotated 45°.

Figure 6:
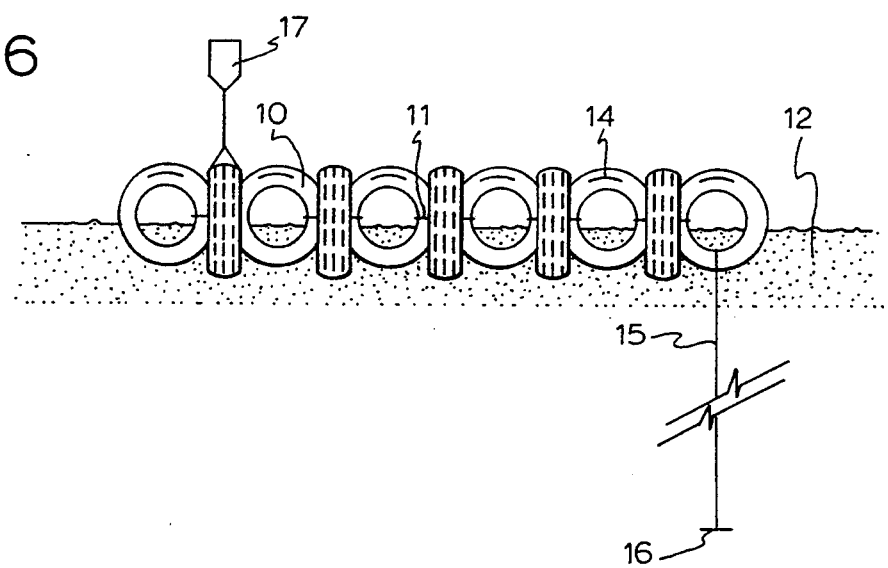
FIG. 6 shows a thread of vertical tires installed on a sand water bottom.

FIG. 6 shows a segment of a thread of vertical tires 10 with fasteners 11, assembled as in FIG. 4. This thread is part of a network of tires according to the invention. Each tire 10 is partially buried as an anchor in the sandy bottom 12 and protrudes above the sand level as a sea life habitat. A mooring line 15 attached to a tire 10 is an additional anchoring buried three meters deep in the sandy bottom 12 with an anti-extraction device 16 at its end. A floating artificial substrate 17 attached to a tire 10 allows the fixation of kelp or shellfish out of reach of creeping predators as urchins or starfish.

Figure 7:
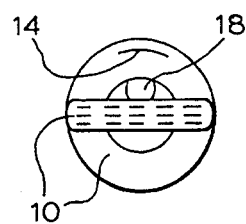
FIG. 7 is a front elevation view of a thread of tires.

FIG. 7 shows a front elevation of a thread of tires 10 assembled as in FIG. 5 with an opening 14 and wherein a removable air filled hose 18 has been inserted at the upper part of the assembly for temporary floating on the water surface.

Figure 8:
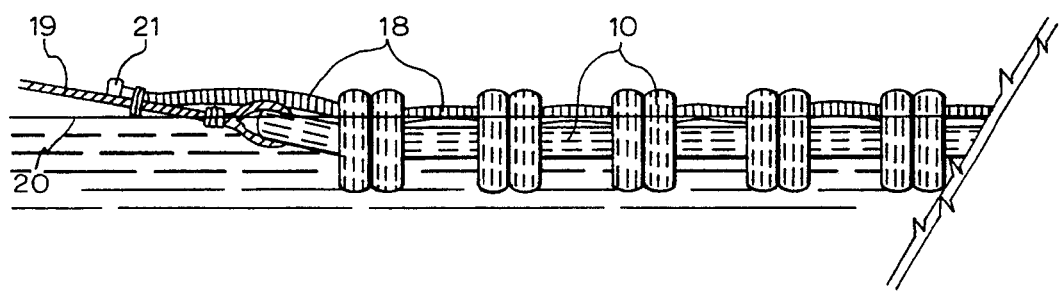
FIG. 8 illustrates a thread of tires floating on the water surface during the installation.

FIG. 8 shows the forehead of a thread of tires 10, element of a network of tires, assembled as in FIG. 5 but with two tires 10 vertically juxtaposed from place to place. This thread floats on the water surface 20 before to be conveyed by a tow boat to the predetermined site where it will be dropped and sunk into the water bottom. A tow line 19 is attached at the front tire of this thread. Openings 14, which are not shown, are situated at the upper position of each tire, this thread is buoyant because a removable air filled hose has been inserted at the upper part of the assembly as already shown in FIG. 7. The hose 18 is made of soft, supple material so that it is flat when empty of air. The hose 18 is filled with air through a valve 21. Once the towed floating thread of tires has reached the predetermined dropping site the valve 21 is opened for air release. A similar valve placed at the other end of hose 18 (not shown) is also opened. As soon as air is released the thread of tires starts sinking then the tow line 19 is detached from the thread3 s front tire and hose 18, empty of air and flat, is pulled out of the sunk thread. During the sinking, the thread rotates on its axis of about 45° so that all tires are in an approximately vertical orientation when they reach the water bottom as seen in FIG. 6. The automatic 45° rotation on the right or on the left is automatic mainly due to the upward shifting of the remaining air pockets trapped in the tires towed at the water surface in an approximately horizontal position as are tires 10d and 10f shown in FIG. 5. Other ways exist to make the thread of tires 10 float temporarily on the water surface. For example, a hose or a line of floats under which the thread of tires 10 is suspended by detachable fasteners. For a tow operation, fasteners 11 which assemble the tires have to be strong enough to hold the towing traction. However, thin fasteners are preferable because they will readily break when an obstacle such as a boat anchor catches on the partially buried tires. Preferred fasteners 11 may be biodegradable as for example the composite of a 12 mm or more diameter biodegradable coconut line and a 6mm or less nonbiodegradable nylon line. The composite fasteners are strong enough at the installment time so as not to break but they are weak enough a few months later so that they will break if caught by a boat anchor dropping on the water bottom.

The above described installation method is particularly practical for operators such as environmental volunteers who prefer to build the artificial reef on the beach and to launch it with little investment and expenses.

Another practical and more inexpensive method is to tow a thread of tires which has not been punctured with air release openings and to tow it without having inserted flotation means such as hose 18. If the towing on the water surface is fast enough and long enough, the air which after launching remains trapped in the tires' upper cavities will be forced out of the tires by the strong water motion. Then the thread will sink as soon as the towing boat stops. This method will drop a thread of tires with some precision on the water bottom.

The launching may also be accomplished from the beach, floating the thread of tires to the desired location and then sinking it to the bottom.

Figure 9:
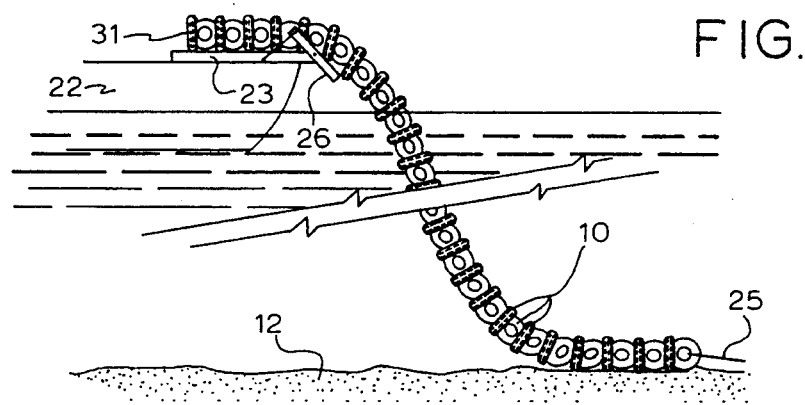
FIG. 9 shows the stern of a boat from which a thread of tires is directly dropped and sunk into the waters.

FIG. 9 shows the dropping of a thread of tires 10 from the stern of a boat 22 where the thread of tires 10 has been assembled as in FIG. 4. A network made of several juxtaposed threads 31 of tires 10 may be dropped into the water one time from the stern of this boat. The first tire 10 to be dropped is connected to a mooring line 25 anchored on the water bottom 12. The assembling of the tires is as shown in FIG. 4 with openings 14 at the upper position of tires 10. When launched into the water, the tires 10 retain no air in their upper perforated cavities. Consequently, this thread 31 sinks immediately after immersion. Proportionately to the thread of tires being assembled, the boat 22 moves in a predetermined direction, the best direction being the direction into the prevailing water current. From boat 22 the thread of tires 10 glides on a platform 23 comprising an horizontal section and an inclined section 26 which leans off the boat 22 towards the water. The inclination of said inclined section is adjustable. The friction of tires 10 on platform 23 slows down and eventually stops the gliding of tires 10 into the water. Switching hooks, not seen in FIG. 7, may be installed on the horizontal section of platform 23 to control this dropping operation.

The above installation method is desirable for operators with industrial resources to operate large programs.

Figure 10:
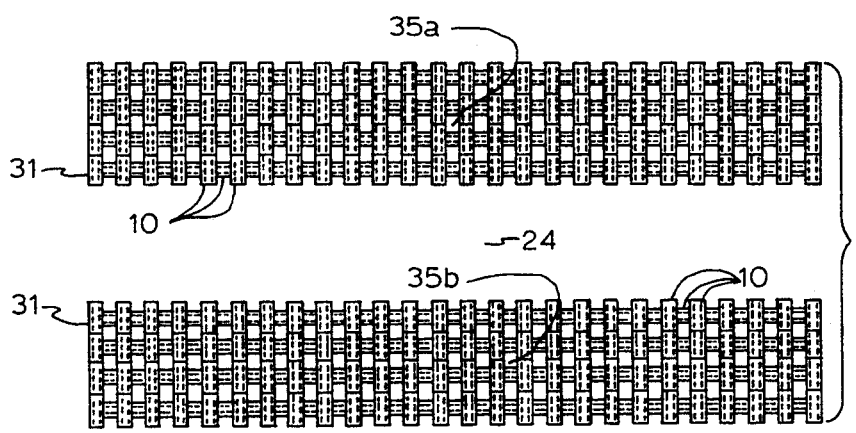
FIG. 10 shows the top view of two networks of tires, each one comprising four threads of tires.

FIG. 10 shows a top view of two segments of parallel networks 35a, 35b of threads 31 of tires 10. In between the networks 35a, 35b is a corridor of bare sand 24. Each network 35a, 35b has been made of four threads 31 of tires 10, assembled on a boat, tied together every approximately ten meters and dropped into the water in one time according to the process illustrated in FIG. 9. This configuration makes an inexpensive, highly productive artificial reef which is a habitat for every kind of species since it offers an altogether of solid substrates, cavities and soft bottom. Such a variety of habitats creates artificially the optimum conditions for all sea life protection, reproduction and development. The highest marine productivity not seen in nature is expected of such an artificial reef.

Thus it is apparent that networks and threads of tires according to the invention are operational elements for the construction of original tire-made, artificial reefs. They can be assembled on land or on a boat. They are easy to be conveyed on the water surface and dropped onto the water bottom. They anchor automatically in sand. These structures stand on the water bottom partially buried and partially protruding in a physical equilibrium controlled by the density differences of sand, tire and water. The fasteners connecting the embedded immobile tires are not subjected to high friction and attrition, and over the years they will be reinforced by the water mineral accreting phenomenon which occurs on immersed immobile objects and which will bind automatically the tires together. If desired, a growth of reef building species of oysters or worms may be artificially developed on the tire substrates to accelerate the accreting binding processes.

The invention is expected to serve the much needed enhancement of coastal waters. It will benefit marine life protection, restoration and development and consequently it will clean the waters through the natural processes of life: growth, degradation, and exportation.

OBJECTS AND ADVANTAGES

Accordingly, among several objects and advantages of my invention of a self anchoring tire-made artificial reef are the objects and advantages of an automatic anchoring process and of lasting protruding structures for aquatic life enhancement. Also, it is to be built inexpensively and to be easily conveyed and installed at a predetermined site on the water bottom.

Half anchor and half habitat is what this new artificial reef achieves. On a sandy bottom for example where sand and water are in frequent motion, the shifting grains of sand are retained and accumulated in the lower cavities of the tire-made network. Also, the lower parts of the tires become embedded in the scours made in the sand when waters in movement hit the tires. The embedding of the lower part of the tires results in the immobilization of the tires which no longer move under storm or big surge. Consequently, and due to this immobility of the partially embedded tires, fasteners and moorings lines (the weak point of previous artificial reefs), are no longer subject to friction, attrition and breakage. The new artificial reef of the invention has an ever lasting anchoring and assembling process. Altogether the embedded tires form a multiplicity of anchors which is worth more than less numerous punctual anchors. The low relief multiple anchor artificial reef adheres strongly by all its pieces to the sandy bottom.

Nevertheless, the embedding of the tires of this network is limited. There is no total subsidence of the artificial reef which keeps protruding above the sand level as life habitat. This unexpected phenomenon which has been observed by the inventor is due to the fact that the density of the tires is in between the density of the sand and the density of the water. The network of tires acts as if it was floating above the stable mass of sand and below the fluid mass of water.

on a very stable sedimentary bottom the network of tires can be thin, made by the flat juxtaposition of used car tires. On a sedimentary bottom with shifting sands the network of tires has to be thick made by special assemblies which bring part of the tires at higher level above the sand level. Some special assemblies can hold all the tires in vertical position. Many different ways exist of assembling tires according to the invention. On a water bottom with important sand shifting the anchoring means of this artificial reef (which are the component tires), may be completed by the addition of moorings such as, for example, mooring lines with anti-extraction devices vertically buried in the sedimentary bottom. These additional moorings may be placed at the edges of a tire network or in the middle of it, at intervals every 25 meters depending upon the application. Said additional moorings can be buried with a waterjet as it has been already described by Antonius Streichenberger in U.S. Pat. No. 4,854,774.

While the above description contains many specifics these should not be construed as limitation on the scope of the invention but rather as an exemplification of preferred embodiments thereof. For example, the installation of networks and threads of tires to make an artificial reef according to the invention, can advantageously stop sand shifting, stabilize water bottom level on large areas and consequently control shoreline erosion.

Thus the scope of the invention should be determined not by the embodiments illustrated but by the appended claims and their legal equivalents.

I claim:

1. A self-anchored artificial reef for aquatic enhancement consisting of a single layer network of vertically assembled used tires, assembled with fasteners, wherein all the tires lie on bottom sediments with their lower parts embedded in water-made scours and anchoredin retained shift sediments and with their upper part protruding above the sediments' level; and wherein each tire is an anchor and a habitat.

2. The artificial reef of claim 1 wherein said fasteners, which assemble the tires, are of different strengths.

3. The artificial reef of claim 1 wherein the density of the whole reef is approximately the same as the density of each component tire; whereby the reef which does not float in the water, and does not subside into the sediments, settles in between water and sediment on the water bottom at the surface of the sediments.

4. The artificial reef of claim 1 wherein said tires of the network are substrates on which sessile vegetal and animal organisms are affixed.

5. The artificial reef of claim 1 wherein said tires of the network are further bound together by sessile vegetal and animal organisms which are artificially grown on the tires.

6. The artificial reef of claim 1 as a means to stabilize water bottoms and control shoreline erosion.

7. A method to install on a water bottom an artificial reef made of a linear used tire network comprising the steps of:

assembling said tires together in a vertical position;

launching said linear network in water where it floats because of air trapped in the tires' upper cavities;

towing the floating linear network towards a site of installation with a boat fast enough to create sufficient water motion to force air out of the tires' upper cavities;

continuing towing until the towed network shows a loss of buoyancy;

stopping the boat at the installation site where the network, having lost buoyancy, will sink to a predetermined spot on the water bottom.

* * * * *